(12) United States Patent
Ahrndt et al.

(10) Patent No.: US 8,934,358 B2
(45) Date of Patent: Jan. 13, 2015

(54) METHOD AND DEVICE FOR DATA PROCESSING

(75) Inventors: Thomas Ahrndt, Ottobrun (DE); Dietmar Gernegross, Oberhaching (DE); Werner Kozek, Vienna (AT); Martin Kuipers, Dallgow-Doeberitz (DE); Bernhard Schweyer, Bad Kohlgrub (DE)

(73) Assignee: Nokia Siemens Networks Oy, Espoo (FI)

( * ) Notice: Subject to any disclaimer, the term of this patent is extended or adjusted under 35 U.S.C. 154(b) by 192 days.

(21) Appl. No.: 13/201,229

(22) PCT Filed: Feb. 11, 2010

(86) PCT No.: PCT/EP2010/051682
§ 371 (c)(1),
(2), (4) Date: Aug. 12, 2011

(87) PCT Pub. No.: WO2010/092099
PCT Pub. Date: Aug. 19, 2010

(65) Prior Publication Data
US 2011/0292783 A1 Dec. 1, 2011

(30) Foreign Application Priority Data

Feb. 12, 2009 (EP) .................... 09100110

(51) Int. Cl.
*G01R 31/08* (2006.01)
*H04B 3/32* (2006.01)
(Continued)

(52) U.S. Cl.
CPC .................. *H04B 3/32* (2013.01); *H04B 3/464* (2013.01); *H04L 25/0226* (2013.01); *H04L 25/0242* (2013.01); *H04L 25/03343* (2013.01); *H04L 5/0007* (2013.01); *H04L 5/0023* (2013.01); *H04L 5/0048* (2013.01); *H04L 25/0204* (2013.01);
(Continued)

(58) Field of Classification Search
CPC ............... H04L 2025/03414; H04L 25/03159; H04L 25/03038; H04L 25/03343; H04B 3/32
See application file for complete search history.

(56) References Cited

U.S. PATENT DOCUMENTS 6,307,889 B1 * 10/2001 Chun ........................... 375/260
7,688,903 B2    3/2010 Okamura
(Continued)

FOREIGN PATENT DOCUMENTS

| CN | 1787426 A | 6/2006 |
|---|---|---|
| WO | 2007029241 A1 | 3/2007 |
| WO | 2009032093 A2 | 3/2009 |

OTHER PUBLICATIONS

Whiting et al.: "DSL Crosstalk Coeficient Acquisition Using SNR Feedback", Global Telecommunications Conference, 2008, IEEE, Globecom 2008. IEEE, Piscataway, NJ, USA, Nov. 30, 2008, pp. 1-5, XP 031370341.

(Continued)

*Primary Examiner* — Jung Park
(74) *Attorney, Agent, or Firm* — Laurence A. Greenberg; Werner H. Stemer; Ralph E. Locher

(57) ABSTRACT

A method and a device for data processing. The data processing method utilizes at least two probing coefficients in a canceller and/or precompensator in combination with SNR feedback to process data in the canceller and/or in the precompensator.

11 Claims, 4 Drawing Sheets

(51) Int. Cl.
   *H04B 3/46* (2006.01)
   *H04L 25/02* (2006.01)
   *H04L 25/03* (2006.01)
   *H04L 5/00* (2006.01)
   *H04L 27/26* (2006.01)

(52) U.S. Cl.
   CPC ........... *H04L 25/0228* (2013.01); *H04L 25/025* (2013.01); *H04L 25/03159* (2013.01); *H04L 27/2656* (2013.01); *H04L 2025/03414* (2013.01); *H04L 2025/03426* (2013.01); *H04L 2025/03624* (2013.01); *H04L 2025/03796* (2013.01); *H04L 2025/03802* (2013.01)
   USPC .......................................... 370/252; 370/465

(56) References Cited

U.S. PATENT DOCUMENTS

| | | | |
|---|---|---|---|
| 7,822,124 B1* | 10/2010 | Rezvani | 375/240.27 |
| 7,830,978 B2 | 11/2010 | Guenach et al. | |
| 2003/0112966 A1* | 6/2003 | Halder et al. | 379/406.05 |
| 2010/0172233 A1* | 7/2010 | Bianchi et al. | 370/201 |
| 2010/0278033 A1 | 11/2010 | Ilani | |
| 2011/0200140 A1* | 8/2011 | Duvaut et al. | 375/296 |

OTHER PUBLICATIONS

ITUT G.993.1: "Series G: Transmission Systems and Media, Digital Systems and Networks, Digital sections and digital line system—Access networks, Very high speed digital subscriber line transceivers", ITUT Recommendation G.993.1 (Feb. 2006).

ITUT G.993.2: Series G: Series G: Transmission Systems and Media, Digital Systems and Networks, Digital sections and digital line system—Access networks, Very high speed digital subscriber line transceivers 2 (VDSL2), ITU-T Recommendation G.993.2 (Feb. 2006).

ITUT G.997.1: Series G: Series G: Transmission Systems and Media, Digital Systems and Networks, Digital sections and digital line system—Access networks, Physical layer management for digital subscriber line (DSL) transceivers, ITU-T Recommendation G.997.1 (Jun. 2006).

* cited by examiner

METHOD AND DEVICE FOR DATA PROCESSING

BACKGROUND OF THE INVENTION

Field of the Invention

The invention relates to a method and to a device for data processing, in particular in a DSL environment.

DSL or xDSL, is a family of technologies that provide digital data transmission over the wires of a local telephone network.

Asymmetric Digital Subscriber Line (ADSL) is a form of DSL, a data communications technology that enables faster data transmission over copper telephone lines than a conventional voice band modem can provide. Such fast transmission is achieved by utilizing frequencies that are normally not used by a voice telephone call, in particular, frequencies higher than normal human hearing.

VDSL (Very High Speed DSL) is an xDSL technology providing faster data transmission over a single twisted pair of wires. High bit rates are achieved at a range of about 300 meters (1000 ft), which allows for 26 Mbit/s with symmetric access or up to 52 Mbit/s in downstream-12 Mbit/s in upstream with asymmetric access.

Currently, standard VDSL uses up to 4 different frequency bands, two for upstream (from the client to the telecom provider) and two for downstream.

According to its high bandwidth, VDSL is capable of supporting applications like HDTV, as well as telephone services (e.g., Voice over IP) and general Internet access, over a single connection.

VDSL2 (Very High Speed Digital Subscriber Line 2) is an access technology that exploits the existing infrastructure of copper wires that were originally used for plain old telephone service (POTS). It can be deployed from central offices (COs), from fiber-fed cabinets preferably located near customer premises, or within buildings.

VDSL2 is designed to support the wide deployment of Triple Play services such as voice, video, data, high definition television (HDTV) and interactive gaming. VDSL2 enables operators and carriers to gradually, flexibly, and cost efficiently upgrade existing xDSL infrastructure.

ITU-T G.993.2 (VDSL2) is an enhancement to G.993.1 (VDSL) that permits the transmission of asymmetric and symmetric (full duplex) aggregate data rates up to 200 Mbit/s on twisted pairs using a bandwidth up to 30 MHz.

Such xDSL wide band modulation approaches are susceptive to crosstalk interference that is introduced to the twisted pair transmission line and received by the modem.

Crosstalk occurs when wires are coupled, in particular between wire pairs of the same or a nearby bundle that are used for separate signal transmission. Hence, data signals from one or more sources can be superimposed on and contaminate a data signal. Crosstalk comprises a near-end crosstalk (NEXT) and a far-end crosstalk (FEXT).

Based on such crosstalk, data signals transmitted over twisted-pair lines can be considerably degraded by crosstalk interference generated on one or more adjacent twisted-pair phone lines in the same and/or a nearby multi-core cable or bundle. With an increasing transmission speed, this problem even deteriorates, which may significantly limit a maximum data rate to be transmitted via a single line.

A multiple-input-multiple-output system (hereinafter referred to as MIMO system) is of significant importance in modern communication technology. Such MIMO system allows modeling crosstalk interference of a telecommunication system.

However, a MIMO system to be fully calculated implies a huge processing effort that sometimes is simply not feasible.

Next generation DSL systems are expected to provide active crosstalk suppression methods. In upstream direction, crosstalk can be cancelled by a matrix canceller associated with a receiver, whereas in downstream direction, crosstalk may have to be precompensated at the transmitter side.

In order to provide for efficient crosstalk cancellation and/or precompensation, a reliable estimate of magnitude and phase of a frequency response of a crosstalk channel is required. In a typical VDSL2 environment, such crosstalk channel comprises about $$2000 \cdot N \cdot N$$

complex coefficients where N denotes a number of ports. Hence, around $10^7$ unknown real numbers for a 48 port line card need to be determined.

Existing channel estimation methods based on 1 bit quantized feedback of decision error per superframe lead to a rather limited learning period that in case of a 48 port line card may require more than 12 minutes for a first configuration.

BRIEF SUMMARY OF THE INVENTION

The problem to be solved is to overcome the disadvantages stated above and in particular to provide for an efficient channel estimation, e.g., in a DSL environment.

This problem is solved according to the features of the independent claims. Further embodiments result from the depending claims.

In order to overcome this problem, a method for data processing is suggested comprising the step of at least two probing coefficients are utilized in a canceller and/or precompensator in combination with SNR feedback to process data in said canceller and/or said precompensator.

It is noted that said probing coefficient can be or comprise multidimensional coefficients or at least one matrix. In particular, several probing coefficients can be used to adjust, modify and/or determine the precompensator and/or the canceller.

It is also noted that said precompensator and/or canceller may be represented each as a matrix and thus matrix operations may be processed pursuant to the probing coefficient and the SNR feedback in order to adjust or modify the respective precompensation and/or cancellation matrix.

The probing coefficient may comprise two, three or several probing coefficients, in particular probing matrices.

Based on a series of probing coefficients (e.g., at least two such multidimensional probing coefficients), the precompensator and/or canceller can be efficiently processed and thus quickly be adjusted.

This approach in particular bears the following advantages:
(1) The feedback channel can be used in a more efficient manner; in fact, an already existing overhead channel can be used for such purpose.
(2) There is no need for superframe synchronization thereby avoiding any interoperability issue with legacy equipment, e.g., CPEs.
(3) Joining and leaving of ports may be performed without any changes to an established training phase of, e.g., VDSL2.

(4) A quality of feedback from the receiver may be largely independent of an SNR level, in particular as long as decisions regarding a majority of DMT subcarriers are predominantly correct.
(5) Crosstalk channel estimation may be conducted about 10-times faster than compared to alternative approaches.
(6) The approach works even during active data processing without any need for an extension of a SISO training phase. Hence, even during normal operation, the data rate to be achieved may meet the requirements of VOIP, WWW, email data traffic.

In an embodiment, the probing coefficients and the SNR feedback is used via a coefficient modulation.

In another embodiment, said probing coefficients are predetermined.

The probing coefficients can be complex valued and may be chosen due to design requirements in order to allow for an efficient and reliable channel estimation as presented herein. Both, the choice of the magnitude and of the complex phase of the coefficients can be deemed subject to tradeoffs:

a) A magnitude $c_0$ can be set to be constant over a whole set as well as within the probing matrices. The tradeoff in selecting this magnitude can be as follows: A small magnitude may indicated a minor influence on the SNR, a too large magnitude however may disrupt data transmission due to large SNR degradation. Hence, a good choice for setting $c_0$ is given by the (loop and frequency) averaged FEXT level measured in a linear scale. For a typical modern ground cable this number may amount to $10^{-3}$, however for poor "voice grade" cables it may reach, e.g., $10^{-2}$. Further fine-tuning can be conducted for setting such magnitude $c_0$.

b) A phase may vary over probing matrices and—as an option or as an alternative—over frequency. One approach could use a step-by-step rotating phase, where a root angle may amount to $2\pi/M$, wherein M determines a number of probing matrices (e.g., a number of SNR measurements). This may lead to a substantially robust phase estimation. A variation over frequency may not be necessary. However, the choice of a rotating phase may assure approximately constant data rate during channel estimation, which means that a minimum stable data rate in the order of, e.g., 50% of the optimum, could be maintained.

Furthermore, said SNR information may be available at a CO receiver for all ports within a chipset and/or a linecard and/or a DSLAM for the upstream direction. For the downstream direction, the SNR information can be provided by the CPEs via an management channel according to G.997 (for example, the G.997 standard includes a defined SNR measurement for ADSL(2+) as well as for VDSL2).

In particular the probing coefficients may be set prior to a training phase.

In a further embodiment, the SNR feedback is data provided by a receiver via a feedback channel.

In particular, legacy communication means, e.g., an overhead channel, may be utilized for such purpose.

In a next embodiment, the precompensator is associated with a central office (CO) and/or a digital subscriber line access multiplexer (DSLAM).

It is also an embodiment that the canceller is associated with a customer premises equipment (CPE).

Pursuant to another embodiment, said data processed comprises a DMT-based multicarrier modulation in a point-to-multipoint scenario.

According to an embodiment, said data processing is applied to a digital subscriber line environment.

According to another embodiment, said method is processed during a training phase of a modem.

In yet another embodiment, said method is iteratively applied.

Iterative Training or intermediate training or adjustment of the canceller and/or precompensator can be applied.

According to a next embodiment, said method is switched to a tracking mode by super-positioning an already estimated optimized canceller and/or precompensator and by a small probing component.

Pursuant to yet an embodiment, said probing coefficients comprise at least two probing matrices.

According to a further embodiment, a phase of the probing coefficients is varied over frequency.

Hence, a well-balanced mixture of suitable and non-suitable phase contributions can be achieved.

The problem stated above is also solved by a device that is arranged such that the method as described herein is executable thereon or by a device comprising a processor unit and/or a hard-wired circuit and/or a logic device that are arranged such that the method as described herein is executable thereon, respectively. The device may also be associated with the specific means for executing the method.

According to an embodiment, the device is a communication device, in particular a central office, a digital subscriber line access multiplexer and/or a customer premises equipment, or the device may be associated with the respective means.

The problem stated supra is further solved by a communication system comprising the device as described herein.

DESCRIPTION OF THE INVENTION

Figure 1:
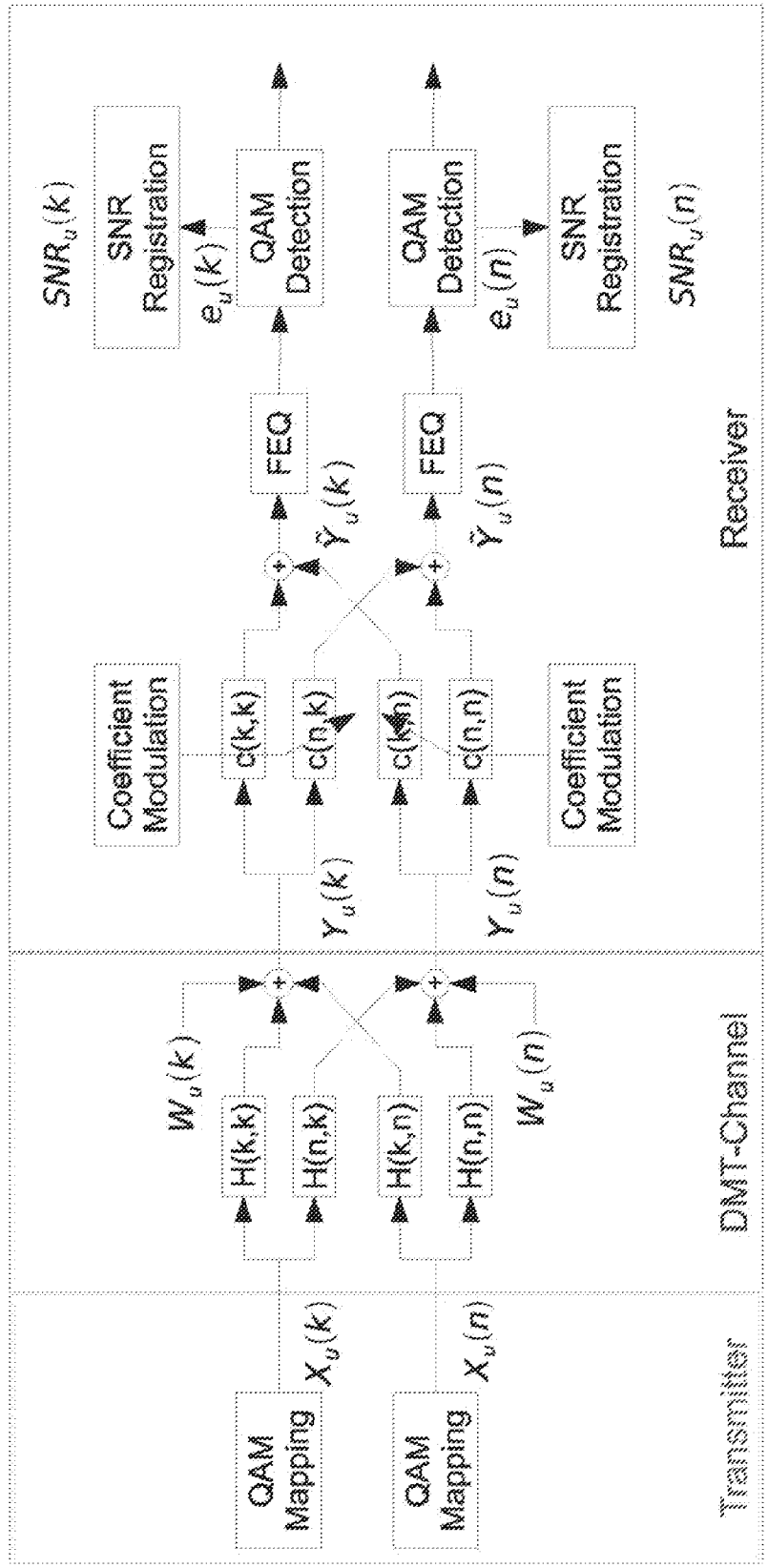
FIG. 1 shows schematics of receiver and transmitter modules for upstream crosstalk channel estimation.

This approach introduces a coefficient modulation (CM) which uses a series of (e.g., predetermined or well designed) complex valued probing coefficients within the canceller and/or precompensator matrix combined with a non-coherent SNR feedback from the receiver during normal data transmission. Based on such a probing phase, a coherent (phase and magnitude) estimate can be determined in a direct, immediate and hence fast way.

The evolution of DSL technology achieves higher bit-rates by broadening the transmission bandwidth. Since loop attenuation and crosstalk increase with frequency, additional measures are required at the DSL transmitter and receiver.

Currently deployed VDSL2 systems use bandwidth up to 17 MHz, while the standard according to ITU-993.2 optionally covers up to 30 Mhz. A typical target bit rate desired is deemed to amount to 100 Mbit/s at a loop length of 0.3 km to 1 km. This is not feasible with the current transceiver technology.

A crosstalk reduction leads to an increase in reach (maximum admissible loop length at a given rate) or in rate (at a given loop length) or to an increased stability with respect to ingress noise induced by electromagnetic interference produced by sources outside the cable plant. Crosstalk mitigation by power back off leads to a dramatic reduction of impulse noise immunity, hence this would not solve crosstalk problems in the long run.

Highly efficient methods for crosstalk compensation and/or cancellation are based on signal processing methods, which may utilize an a priori estimate of the crosstalk transfer function. The approach provided may in particular utilize a DMT-based multicarrier modulation setup in a point-to-multipoint scenario. A transmission signal may comprise 256 DMT-frames containing the information bits adaptively QAM-modulated onto a multitude of subcarriers followed by a so-called sync symbol (i.e., a predefined data pattern QAM-modulated onto the same multitude of subcarriers). Hence, these 257 DMT-frames put together are called DMT superframe according to and/or based on the VDSL2 context (sometimes referred to as 'hyperframe' in the ADSL context).

Frame synchronization may be assumed. However, the approach suggested does not require for superframe synchronization. The frequency domain input-output relation of an uncompensated channel H can be summarized as $$y_k(n) = \sum_{l=0}^{K_{port}} D_{feq}(k,n) H(k,l,n) x_l(n) + D_{feq}(k,n) w_k(n) \quad (1)$$

wherein
$D_{feq}$ denotes a (diagonal) matrix comprising frequency domain equalizer (FEQ) coefficients;
$x_l(n)$ are transmit QAM symbols;
$y_k(n)$ are receive QAM symbols;
$w_l(n)$ is an additive receiver noise;
n is a sub-carrier index; and
k, l are port-indices.

Equation (1) applies for upstream and downstream directions.

FEQ coefficients could be assumed according to $$D_{feq}(k,n) = 1/H(k,k,n). \quad (2)$$

Advantageously, a diagonal-dominant channel matrix H may be utilized:

$$|H(k,l,n)(1-\delta_{k,l})| << |H(k,k,n)| \forall k,l,n, \quad (3)$$

wherein
$\delta_{k,l}$ is Kronecker's delta:

$$\delta_{k,l} = 1 \text{ if } k=l; \quad (4)$$

$$\delta_{k,l} = 0 \text{ if } k \neq l. \quad (5)$$

Upstream Cancellation

In upstream direction the receivers can be collocated in a single hardware entity (e.g., a line card, a DSLAM). Hence, far-end crosstalk (FEXT) cancellation can be performed based on jointly processing received signals as follows:

$$y_k(n) = \sum_{l=0}^{K_{port}} D_{feq}(k,n) H(k,l,n) x_l(n) + D_{feq}(k,n) w_k(n), \quad (6)$$

wherein
C denotes a matrix-valued frequency domain upstream cancellation matrix.

The cancellation acts as a linear matrix on the FEQ-equalized reception signals $$\tilde{y}_{k,u}(n) = \sum_{l=0}^{K_{port}} C(k,l,n) y_{l,u}(n). \quad (7)$$

As a consequence of the diagonal dominance (see equation (3)), a so-called off-diagonal zero-forcing canceller provides an optimum:

$$C_{opt} = (D_{feq,u} H_u)^{-1} \quad (8)$$

Downstream Precompensation

In downstream direction the receivers are separated, hence it is necessary to perform linear precompensation on the transmitter side:

$$\tilde{y}_{k,d}(n) = \sum_{k=0}^{K_{port}} (D_{feq,u} H P)(k,l,n) x_{l,d}(n), \quad (9)$$

wherein
$x_{l,d}(n)$ denotes downstream transmit symbols; and
P denotes a precompensation matrix.

An optimized precompensation matrix $P_{opt}$ is given by an off-diagonal inversion of the downstream FEXT channel as follows:

$$P_{opt} = (D_{feq,d} H_d)^{-1}. \quad (10)$$

Channel estimation relates to a system identification problem, which may basically require some observation of an input signal and of an output signal of such system. Standard system identification methods assume complete knowledge of input and output samples. Semi-blind and blind methods use incomplete knowledge of the input and/or output signal to identify the system.

The physical channel may not be restricted to the loop plant, but it may rather comprise a mixed-signal processing at the transmitter and at the receiver (analog attenuation and filtering stages, A/D conversion, D/A conversion, analog balancing filters).

Preferably, after an initial convergence of a channel estimation (e.g., in the field of Digital Subscriber Line, DSL) it may still be advantageous to keep track of (minor) changes of the channel transfer function.

It is noted that the approach provided is applicable for upstream cancellation and for downstream precompensation purposes.

Coefficient Modulation (CM): Upstream Canceller

Regarding Coefficient modulation (CM) as suggested herewith, a transmitter and a receiver act in their usual way up to an insertion of the linear cancellation matrix.

Figure 3:
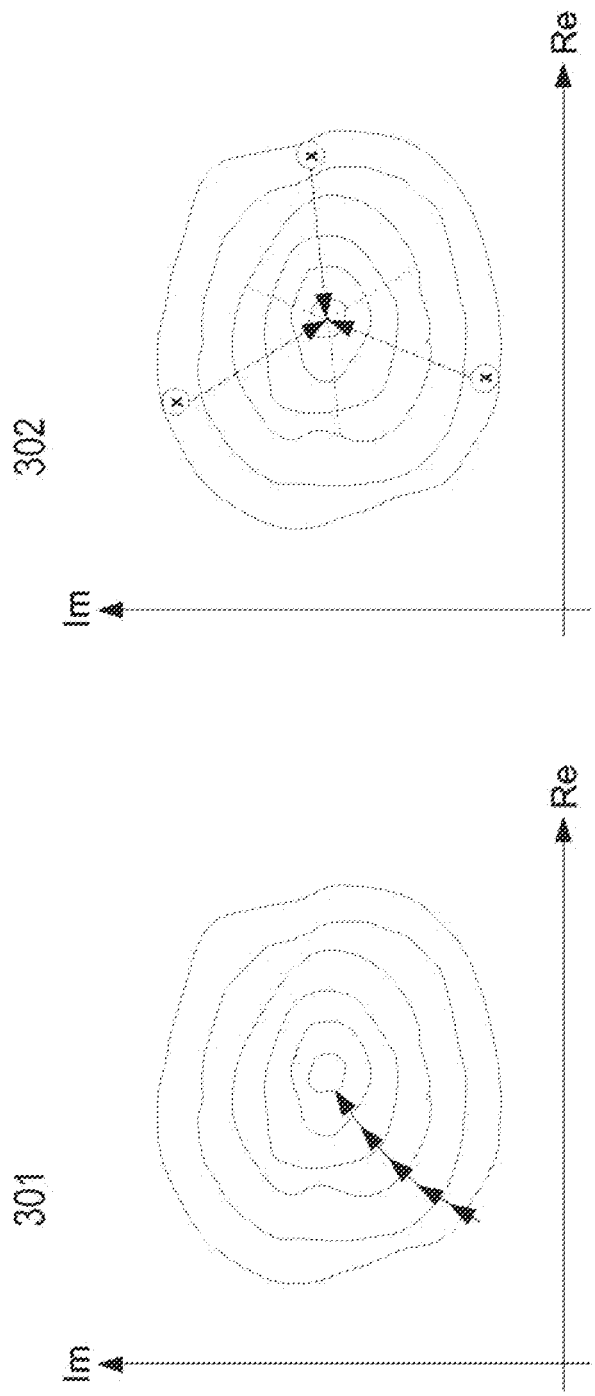
FIG. 3 depicts a principle of an estimation comparing a graph 301 showing a gradient type estimation with a graph showing a probing type estimation.

Rather than performing a gradient-type step size search, the training period comprises applying a set of predefined cancellation matrices $$C_{prob}^{(m,k_0)}$$

with a particular structure as shown in FIG. 3. Hence, FIG. 3 depicts a principle of estimation: Graph 301 shows a gradient type and graph 302 shows a probing type with M=3. Pursuant to the probing type utilizing three starting point, the estimation is much faster than the gradient type approach.

Up to the diagonal, only a single column (with column index $k_0$) has non-vanishing entries and these entries can be complex 2D trigonometric polynomials $$e^{j2\pi(m/M + n/N_0)}$$

with constant magnitude $c_0$:

$$C_{prob}^{(m,k_0)}(k,l,n) \doteq c_0 e^{j2\pi(m/M+n/N_0)}(1-\delta_{k,k_0})\delta_{k_0,l}+\delta_{k,l} \quad (11)$$

with $0 \leq k_0 \leq K_{port}-1$;
and $0 < m < M$
wherein
$k_0$ is a column index that runs through the matrix size $K_{port}$;
M determines a number of probing matrices applied per column;
m is an index of the probing; and
n is a discrete multi-tone (DMT) subcarrier index.

A minimum size for stable estimation without an a priori knowledge may amount to M=3. If the magnitude is known (via a re-estimation of a joining line) the number of probing matrices applied per column may amount to M=2 in particular under mildly stationary SNR conditions. Highly fluctuating interference such as Single High Impulse Noise (SHINE) may require a higher number of probing matrices.

Values of $N_0$ and $c_0$ may be design parameters that can be tuned pursuant to particular requirements that may depend on the actual environment.

A signal-to-noise ratio after applying the probing matrix according to equation (11) amounts to $$\left(\frac{S}{N}\right)^{(m,k_0)}(k,n) = \frac{|1+c_0 e^{j2\pi(m/M+n/N_0)}h(k,k_0,n)|^2}{\sum_{l=0,l\neq k}^{K_{port}-1}|h(l,k,n)+c_0 e^{j2\pi(m/M+n/N_0)}h(l,k_0,n)|^2} \quad (12)$$

If such probings are repeated, a highly nonlinear system of equations for complex-valued and unknown FEXT channel coefficients h(k,l) may be obtained. An exact solution of this problem appears to be difficult. However, for a small probing magnitude $c_0$, an approximation may be utilized as follows:

$$\left(\frac{S}{N}\right)^{(m,k_0)}(k,n) \approx \frac{|1+c_0 e^{j2\pi(m/M+n/N_0)}h(k,k_0,n)|^2}{\sum_{l=0,l\neq k}^{K_{port}-1}|h(l,k,n)|^2} \quad (13)$$

for $c_0 \ll 1$

A value for $c_0$ may be an average FEXT level to be expected, which may ensure
(i) validity of this approximation; and
(ii) that the probing method may not result in large SNR deviations, which would otherwise deteriorate important receiver functionalities such as FEQ adaptation or phase recovery.

The resulting system of equations may be solved as follows:
For any complex number $|z|^2=z\text{conj}(z)$, equation (13) results in:

$$\left(\frac{S}{N}\right)^{(m,k_0)}(k,n) \approx \quad (14)$$

$$\frac{1+2\text{Re}\{c_0 e^{j2\pi(m/M+n/N_0)}h(k,k_0,n)\}+c_0^2|h(k_0,k,n)|^2}{\sum_{l=0,l\neq k}^{K_{port}-1}|h(l,k,n)|^2}$$

In addition, a difference between specific pairs of probing results is suggested:

$$\Delta_{S/N,s}(m,k,k_0,n) \doteq \left(\frac{S}{N}\right)^{(M/4+m,k_0)}(k,n) - \left(\frac{S}{N}\right)^{(M/4-m,k_0)}(k,n) \quad (15)$$

$$\Delta_{S/N,c}(m,k,k_0,n) \doteq \left(\frac{S}{N}\right)^{(m,k_0)}(k,n) - \left(\frac{S}{N}\right)^{(M/2-m,k_0)}(k,n) \quad (16)$$

Using elementary properties of trigonometric polynomials, equations (15) and (16) can be converted to $$\Delta_{S/N,s}(m,k,k_0,n) \approx \quad (17)$$

$$\frac{4c_0|h(k,k_0,n)|\sin(2\pi(m/M+n/N_0)+\phi_h(k,k_0,n))}{\sum_{l=0,l\neq k}^{K_{port}-1}|h(l,k,n)|^2}$$

$$\Delta_{S/N,c}(m,k,k_0,n) \approx \quad (18)$$

$$\frac{4c_0|h(k,k_0,n)|\cos(2\pi(m/M+n/N_0)+\phi_h(k,k_0,n))}{\sum_{l=0,l\neq k}^{K_{port}-1}|h(l,k,n)|^2}$$

with $$\phi_h(k,k_0,n) \doteq \arg\{h(k,k_0,n)\}. \quad (19)$$

The quotient of the above defined SNR differences $$\Delta_{S/N,s}(m,k,k_0,n) \text{ and } \Delta_{S/N,c}(m,k,k_0,n)$$

depends only on a channel phase (and the known design parameters of the probing matrix):

$$\tan(2\pi(m/M+n/N_0)+\phi_h(k,k_0,n)) \approx \frac{\Delta_{S/N,s}(m)}{\Delta_{S/N,c}(m)} \quad (20)$$

Based on equation (20), a least-squares optimum phase estimate can be determined by averaging over differentiated probing results:

$$\phi_{h,est}(k,k_0,n) = \sum_{m=0}^{M-1} \arctan\left(\frac{\Delta_{S/N,s}(m,k,k_0,n)}{\Delta_{S/N,c}(m,k,k_0,n)}\right) - \pi(M-1)\left(1+\frac{Mn}{N_0}\right) \quad (21)$$

An advantageous minimum number of canceller probings utilized that may lead to a consistent estimation appears to amount to 4 per MIMO matrix column. However, by introducing a constant phase offset of $\pi/4$ in equation (11), a total number of 3 probings per MIMO matrix column may suffice. Also, for example, probings in the order of 4 or in the order of a multiple of 4 may be applicable as well.

A phase estimate can be based on a finite number of measurements where it achieves a guaranteed precision. Numerical experiments show that even with a minimum number of probings a sufficient quality of the phase estimate can be reached.

The differential probing underlying the phase estimate allows for another advantage of this approach: The phase estimation quality may not be based or influenced by absolute changes in SNR (in particular regarding a so-called "high-SNR regime", which is the normal operating mode on all used DMT tones; in a "low SNR-regime", a bit error rate (BER) is so high that the SNR measurement precision becomes affected by decision errors).

By nature of the linear regression underlying the summation in equation (21), an outlier detection scheme can be implemented, which allows discarding an SNR measurement that is subject to a fluctuating noise.

A frequency dependency of the probing matrix appears to result in further complications. However, by varying the probing phase over frequency, a well-balanced mixture of suitable and non-suitable phase contributions of the canceller during the probing phase can be achieved. This is extremely helpful for the important use case of a new port joining the MIMO system. Experiments show that the probing phase can be performed without severe data rate degradation. Hence, the cancellation method obeys a "nil nocere" law during probing phase, i.e., the data rate is not significantly lower than a single input single output (SISO) data rate attainable without such cancellation.

In order to determine an unbiased estimate of a magnitude, an orthogonality relation for trigonometric polynomials is utilized:

$$\sum_{m=0}^{M-1} e^{j2\pi m((k-n)/M)} = M\delta_{kn}, \quad (22)$$

which means, in particular by setting k=1 and n=0, that the mean value vanishes:

$$\sum_{m=0}^{M-1} e^{j2\pi(m/M)} = 0. \quad (23)$$

Applying this equation (23) to evaluate the summation over equation (14), the result amounts to:

$$\frac{1}{M}\sum_{m=0}^{M-1}\left(\frac{S}{N}\right)^{(m,k_0)}(k,n) = \frac{1+c_0^2|h(k,k_0,n)|^2}{\sum_{l=0,l\neq k}^{K-1}|h(l,k,n)|^2} \quad (24)$$

Equation (24) can be reformulated as follows:

$$\sigma(k, k_0, n) \doteq \frac{1}{M}\sum_{m=0}^{M-1}\left(\frac{S}{N}\right)^{(m,k_0,n)}(k,n) \quad (25)$$

A product of equation (17) and equation (18) amounts to:

$$\sum_{l=0,l\neq k}^{K-1}|h(l,k,n)|^2 = \quad (26)$$

$$2\sqrt{2}\, c_0|h(k,k_0,N)|\sqrt{\frac{\sin(2(2\pi(m/M+n/N_0)+\phi_h(k,k_0))}{\Delta_{S/N,s}(m,k,k_0,n)\Delta_{S/N,c}(m,k,k_0,n)}}.$$

Introducing a variable $$\rho(k,k_0,n,m) \doteq \sqrt{\frac{\sin(2(2\pi(m/M+n/N_0)+\phi_h(k,k_0))}{\Delta_{S/N,s}(m,k,k_0,n)\Delta_{S/N,c}(m,k,k_0,n)}} \quad (27)$$

and combining equations (24) and (26) results in a quadratic equation for |h(k, $k_0$, n)|:

$$\sigma(k,k_0,n) = \frac{1+c_0^2|h(k,k_0,n)|^2}{2\sqrt{2}\,c_0|h(k,k_0,n)|\rho}. \quad (28)$$

This leads to the desired estimate simply by averaging the remaining m-independence, which minimizes the variance of the estimate:

$$|h(k,k_0,n)|_{est} = \frac{1}{M}\sum_{m=0}^{M-1}\frac{\sqrt{2}\,\rho(k,k_0,n,m)\sigma(k,k_0,n)}{c_0} \pm \quad (29)$$

$$\sqrt{2\left(\frac{\rho(k,k_0,n,m)\sigma(k,k_0,n)}{c_0}\right)^2 - 1}$$

The sign of the square root can be checked by back-substitution into the underlying condition according to equation (26).

FIG. 1 shows schematics of receiver and transmitter modules for upstream crosstalk channel estimation.

The transmitter conveys signals X via several lines k, n towards the receiver via a DMT channel that is described by a matrix H. At the receiver, a canceller c is supplemented by coefficient modulation in order to reduce crosstalk (between the lines n and k) and additional noise W utilizing a SNR determined via an error rate e(n), e(k) by the receiver (see "SNR registration").

Coefficient Modulation (CM): Downstream Precompensation

The above discussed principle of FEXT channel estimation via "modulation" of the upstream canceller can be easily extended for downstream precompensation. Here, the probing matrix is given by:

$$P_{prob}^{(m,k_0)}(k,l,n) \doteq p_0 e^{j2\pi(m/M+n/N_0)}(1-\delta_{l,k_0})\delta_{k_0,k}+\delta_{k,l} \quad (30)$$

with $0 \leq k_0 \leq K-1$
and $0 < m < M$.

Hence, instead of a row-wise probing utilized for cancellation purposes, a column-wise probing at the downstream transmitter may apply. The formulas discussed above are applicable, only k and $k_0$ need to be exchanged.

Figure 2:
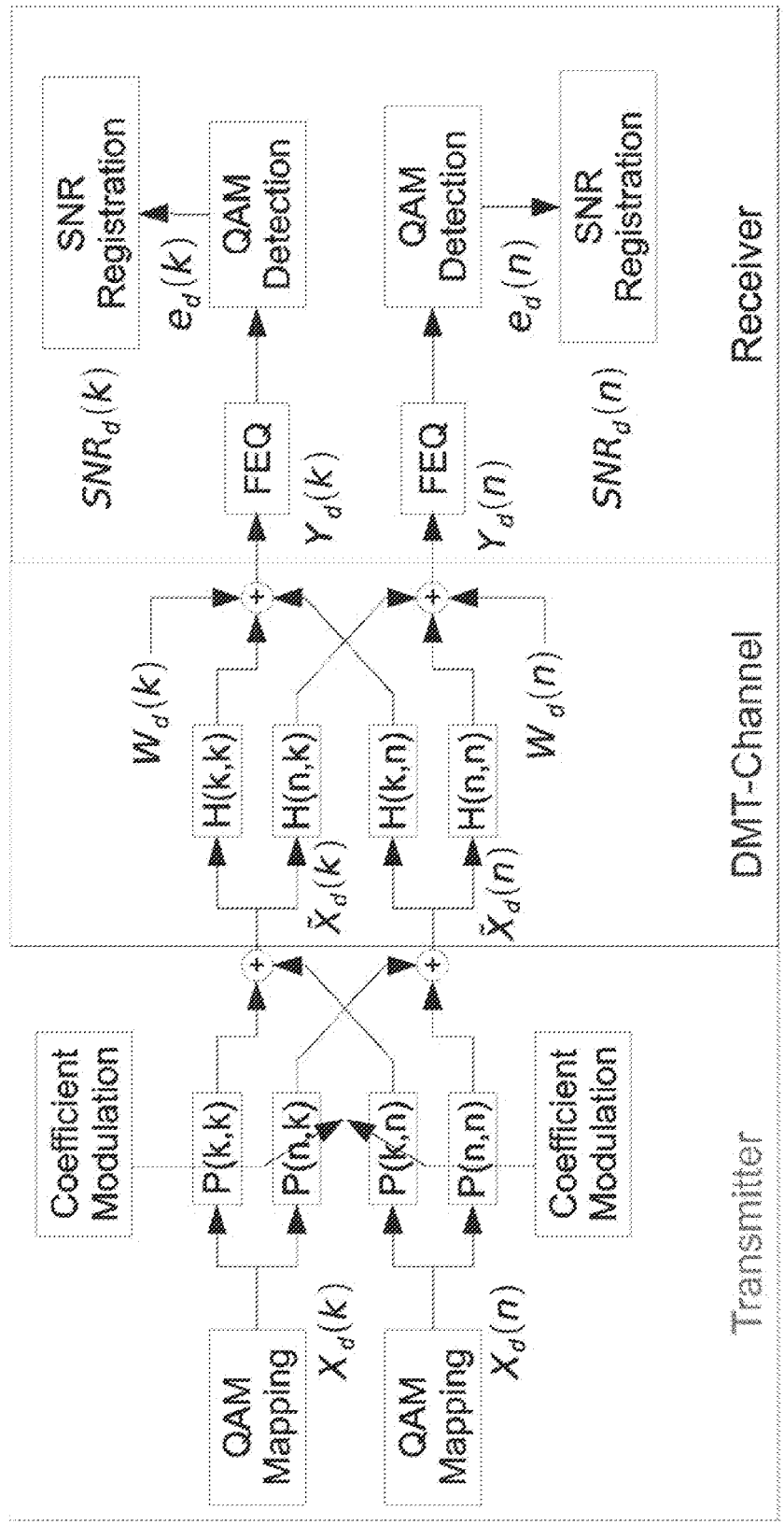
FIG. 2 shows schematics of receiver and transmitter modules for downstream crosstalk channel estimation.

FIG. 2 shows schematics of receiver and transmitter modules for downstream crosstalk channel estimation.

The transmitter conveys signals X via several lines k, n towards the receiver via a DMT channel that is described by a matrix H. A precompensator P performs preprocessing (precompensation) at the transmitter being supplemented by coefficient modulation in order to reduce crosstalk (between the lines n and k) and additional noise W utilizing a SNR determined via an error rate e(n), e(k) by the receiver (see "SNR registration"). Such SNR information (per line k, n) needs to be conveyed to the transmitter for coefficient modulation purposes. This is preferably done via an (existing) feedback channel.

Joining and Tracking of MIMO Channels

If a customer premises equipment (CPE) joins or rejoins a MIMO group, the modem state machine of the joining link is preferably synchronized both on the superframe and on the DMT-frame level whenever an LMS-type method for channel estimation is used.

It is an advantage of this SNR-based method that there is no need for any synchronization on the superframe level, because there is no hinge on any temporal correlation between sync-symbols. Based on standardized seamless-rate adaptation, this method allows for legacy joining of VDSL2 loops, i.e., there is no need for changing the SISO training state machine.

After an initial convergence, a tracking method can be utilized due to a certain amount of small time variation (due to temperature drifts, humidity on overhead transmission lines, etc.). If Coefficient Modulation is used for initial estimation purposes, either a slow gradient type update method can be utilized, or—alternatively—the Coefficient Modulation approach could be switched to a tracking mode by superpositioning the already estimated optimized zero-forcing off-diagonal canceller and a small probing component:

$$C(k,l,n)=C_{opt}(k,l,n)+\epsilon C_{prob}^{(m,k0)}(k,l,n). \quad (31)$$

Completely parallel to the above discussed estimation theory, optimum estimates for magnitude and phase gradients can be obtained for the canceller matrix. The choice of E may be such that the SNR activity is small, but clearly above the resolution, e.g., it may amount to 0.2 dB.

Figure 4:
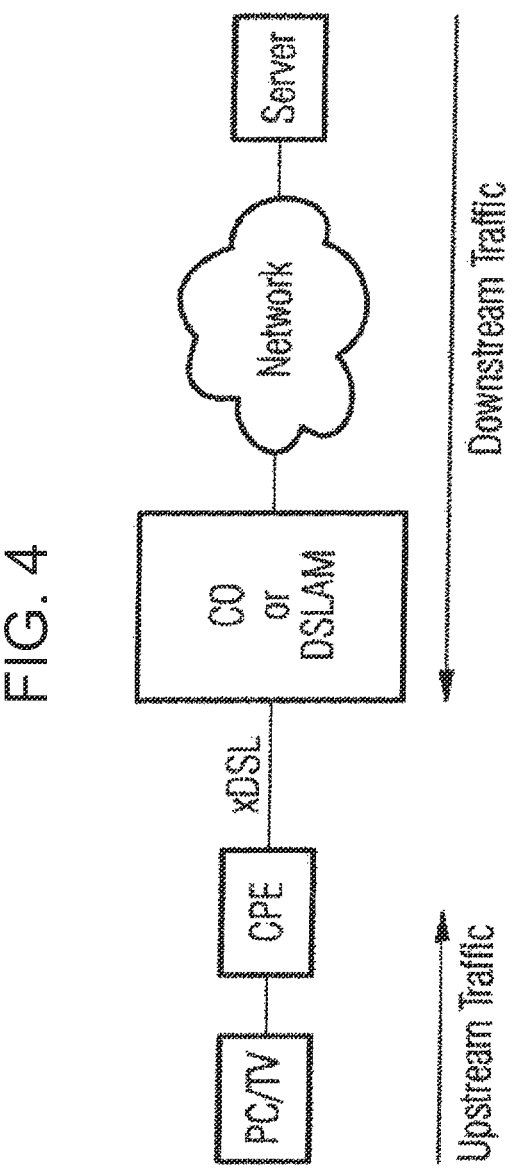
FIG. 4 shows a scenario comprising a communication network allowing to send data from a server to a client in particular via an xDSL connection.

A particular scenario of a communication network is shown in FIG. 4. Downstream Traffic is conveyed from the Server via a Network to a Central Office or Digital Subscriber Line Access Multiplexer CO/DSLAM. The CO/DSLAM is further connected via a digital subscriber line xDSL to a Customer-Premises Equipment CPE. The digital subscriber line connection can be in particular of the following type:

Asymmetric Digital Subscriber Line ADSL, ADSL2, ADSL2+;
High Data Rate Digital Subscriber Line HDSL;
Very High Speed Digital Subscriber Line VDSL, VDSL2.

The customer can be connected to the Customer-Premises Equipment CPE via a set-top box and a television or via a personal computer PC/TV. Data that is sent from the PC/TV towards the Server is referred to as Upstream Traffic.

Preferably, an operator or provider wants to efficiently use the xDSL downstream direction from the CO/DSLAM to the CPE by employing high data rate with low crosstalk effects.

The approach presented herein may be run within the CO/DSLAM and/or within the CPE. However, advantageously, a provider may only modify the CO/DSLAM to be able to run the methods as presented herein. In particular, the CPE does not have to be changed or modified.

The approach shown can be in particular used with discrete multitone modulation (DMT) or Orthogonal Frequency-Division Multiplexing (OFDM).

Further Advantages:

In contrast to the LMS-type channel estimation method, the approach provided is inherently robust with respect to external noise due to the differential SNR evaluation technique. The approach is in particular applicable in an environment of a bit error rate being in the sphere of $10^{-7}$.

Advantageously, a threshold could be provided according to which a wrong decision leading to an incorrect SNR measurement can be avoided (e.g., due to poor SNR).

As DSL nearly always operates in a high SNR regime, the approach provided works well for any stable DSL link regardless of loop length or noise condition.

An initial estimation time for a completely unknown channel may depend on an availability of repeated SNR measurements. On the other hand, estimation time increases in a linear manner with a number of ports to be supplied. In full legacy versions, there is a minimum estimation time of 30 seconds per port, because standard ITU-997.1 allows up to 10 seconds for a single SNR measurement (this would lead to 24 minutes for a 48 port line card). Theoretically, it may suffice to use about 100 DMT frames for a reliable "instantaneous" SNR measurement, which would result in a estimation time of about 0.1 seconds per port, i.e., in a total of 5 seconds estimation time for the 48 port vectoring group.

Concerning the computational complexity in terms of CPU efforts, a complex algorithm does not necessarily mean high computational complexity. A full numerical experiment including the probing phase (via SNR log file) takes 5 seconds per tone. The computational burden can be reduced by exploiting correlation between tones and across ports or by providing a legacy compatible non-coherent crosstalk estimation in advance to the initial startup of a line card with precompensation and/or cancellation. In a multiuser spectrum optimization scenario, a non-coherent crosstalk estimate is sufficient, i.e. the phase of the crosstalk may not affect the optimization.

LIST OF ABBREVIATIONS

A/D Analog to Digital
BER Bit Error Rate
CM Coefficient Modulation
CPE Customer Premises Equipment
CRC Cyclic Redundancy Check
D/A Digital to Analog
DMT Discrete Multitone
DSL Digital Subscriber Line
FEC Forward Error Correction
FEQ Frequency Domain Equalizer
FEXT Far-End Crosstalk
LMS Least Means Square
MIMO Multiple Input Multiple Output
NEXT Near-End Crosstalk
OFDM Orthogonal Frequency-Division Multiplexing
QAM Quadrature Amplitude Modulation
QoS Quality-of-Service
SHINE Single High Impulse Noise
SISO Single Input Single Output
SNR Signal-To-Noise Ratio
TEQ Time Domain Equalizer
ZF Zero Forcing

The invention claimed is:

1. A method for adjusting at least one of a canceller and a precompensator for data processing in a point-to-multipoint scenario, wherein the data being processed includes a discrete multitone (DMT)-based multicarrier modulation, the method comprising:
   providing a set of predefined probing matrices having complex value probing coefficients to at least one of the canceller and the precompensator, the probing coefficients having a constant magnitude over a whole set of probing matrices and a phase varying over the set of probing matrices; and
   utilizing respective probing matrices in at least one of the canceller and the precompensator in combination with signal-to-noise (SNR) feedback.

2. The method according to claim 1, which comprises utilizing each probing matrix and the SNR feedback via a coefficient modulation.

3. The method according to claim 1, wherein the SNR feedback is data provided by a receiver via a feedback channel.

4. The method according to claim 1, wherein the precompensator is associated with at least one of a central office or a digital subscriber line access multiplexer.

5. The method according to claim 1, wherein the canceller is associated with a customer premises equipment.

6. The method according to claim 1, which comprises applying the data processing to a digital subscriber line environment.

7. The method according to claim 1, which comprises carrying out the method steps during a training phase of a modem.

8. The method according to claim 1, which comprises switching to a tracking mode by super-positioning an already estimated optimized canceller and/or precompensator and by a small probing component.

9. A data processing device, configured to execute thereon the method according to claim 1.

10. The device according to claim 9, configured as a communication device.

11. The device according to claim 10, wherein the communication device is selected from the group consisting of a central office, a digital subscriber line access multiplexer, and a customer premises equipment.

\* \* \* \* \*